United States Patent
Oyobe et al.

(10) Patent No.: US 7,847,495 B2
(45) Date of Patent: Dec. 7, 2010

(54) HYBRID VEHICLE AND METHOD OF CONTROLLING THE SAME

(75) Inventors: Hichirosai Oyobe, Toyota (JP); Makoto Nakamura, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 300 days.

(21) Appl. No.: 11/919,501

(22) PCT Filed: Aug. 30, 2006

(86) PCT No.: PCT/JP2006/317686

§ 371 (c)(1),
(2), (4) Date: Oct. 29, 2007

(87) PCT Pub. No.: WO2007/026946

PCT Pub. Date: Mar. 8, 2007

(65) Prior Publication Data

US 2009/0058326 A1 Mar. 5, 2009

(30) Foreign Application Priority Data

Sep. 1, 2005 (JP) ............................ 2005-253476

(51) Int. Cl.
*H02P 1/54* (2006.01)
(52) U.S. Cl. .......................... 318/53; 318/105; 318/106
(58) Field of Classification Search .................... 318/53, 318/105, 106; 180/53.1, 54.1, 65.1, 65.3, 180/65.5, 69.4, 69.5, 69.6
See application file for complete search history.

(56) References Cited

U.S. PATENT DOCUMENTS

| 5,815,824 | A | | 9/1998 | Saga et al. | |
|---|---|---|---|---|---|
| 5,841,201 | A | * | 11/1998 | Tabata et al. ............... | 290/40 C |
| 6,116,363 | A | * | 9/2000 | Frank ....................... | 180/65.25 |
| 6,428,444 | B1 | | 8/2002 | Tabata | |
| 6,464,608 | B2 | * | 10/2002 | Bowen et al. .................. | 475/5 |
| 6,589,128 | B2 | * | 7/2003 | Bowen ........................... | 475/5 |

(Continued)

FOREIGN PATENT DOCUMENTS

JP A 06-165309 6/1994

(Continued)

OTHER PUBLICATIONS

Jan. 5, 2010 Office Action issued in Japanese Patent Application No. 2005-253476.

(Continued)

*Primary Examiner*—Walter Benson
*Assistant Examiner*—Thai Dinh
(74) *Attorney, Agent, or Firm*—Oliff & Berridge, PLC

(57) ABSTRACT

A hybrid automobile, wherein a second power source operated with less frequency can be forcibly operated. The hybrid automobile comprises a storage battery as a first power source. The hybrid automobile further comprises an engine and a motor generator or a fuel cell as the second power source. When the hybrid automobile is run by the first power source, a driver can change over an operation mode to a running by the second power source by operating an input device. The hybrid automobile further comprises a notification means for prompting the driver to operate the input device when the non-operating time of the second power source exceeds a predetermined time or longer.

15 Claims, 10 Drawing Sheets

U.S. PATENT DOCUMENTS 6,648,785 B2 * 11/2003 Porter .......................... 475/5
2006/0006832 A1 * 1/2006 Kitajima et al. ............. 318/800

FOREIGN PATENT DOCUMENTS

| JP | A 06-187595 | 7/1994 |
|---|---|---|
| JP | A 08-093610 | 4/1996 |
| JP | A 08-126121 | 5/1996 |
| JP | A 08-154307 | 6/1996 |
| JP | A 10-028302 | 1/1998 |
| JP | A-11-075302 | 3/1999 |
| JP | A 11-164402 | 6/1999 |
| JP | A-2000-295707 | 10/2000 |
| JP | A-2001-231109 | 8/2001 |
| JP | A-2003-189411 | 7/2003 |
| JP | A-2004-330924 | 11/2004 |
| WO | WO 96/01193 A1 | 1/1996 |

OTHER PUBLICATIONS

European Search Report issued in European Application No. 06797562.3 on Nov. 13, 2009.

* cited by examiner

| CONTROL AT A TIME OF CHARGING | BOOST CONVERTER | | FIRST INVERTER | | SECOND INVERTER | |
|---|---|---|---|---|---|---|
| | Q1 | Q2 | Q11 | Q12 | Q21 | Q22 |
| VAC>0:(V1>V2) | ON | OFF | OFF OR SWITCHING | SWITCHING | OFF | ON |
| VAC<0:(V1<V2) | ON | OFF | OFF | ON | OFF OR SWITCHING | SWITCHING |

HYBRID VEHICLE AND METHOD OF CONTROLLING THE SAME

TECHNICAL FIELD

The present invention relates to a hybrid vehicle, and more particularly to a hybrid vehicle capable of traveling while switching between a hybrid mode of traveling by driving a plurality of motive power sources and an electric vehicle mode of traveling only using electric power from an electricity storage device.

BACKGROUND ART

Recently, hybrid vehicles have received great attention against the background of environmental issues. A hybrid vehicle is a vehicle on which a plurality of motive power sources are mounted, and a hybrid vehicle using an electricity storage device (battery, capacitor or the like) and a motor, in addition to a conventional engine, as motive power sources has already been put into practice.

Furthermore, a fuel cell vehicle on which a fuel cell is mounted as a motive power source also receives attention. A vehicle equipped with an electricity storage device such as a battery or a capacitor, in addition to a fuel cell, as an electric power supply is also a hybrid vehicle equipped with a plurality of motive power sources, in a broad sense.

On the other hand, a hybrid vehicle with an external charging function of charging an electricity storage device using an external electric power supply is known. According to the hybrid vehicle with an external charging function, if the electricity storage device can be charged, for example, by a commercial power supply at home, advantageously, the frequency of going to refueling stations for fuel fill can be reduced.

Japanese Patent Laying-Open No. 8-154307 discloses a hybrid vehicle including a charging function from the outside of the vehicle to an electricity storage device. This hybrid vehicle includes a battery which can be charged by an external charger, an electric motor driving wheels by electricity from the battery, control means for controlling an operation of the electric motor, an internal combustion engine used directly or indirectly for driving wheels, and travel time relation amount calculation means for calculating the amount related with a travel time since charging of the battery by the external charger. Then, the control means restricts an output of the electric motor when a travel time relation amount calculated by the travel time relation amount calculating means reaches a prescribed amount.

In this hybrid vehicle, the output of the electric motor is restricted when the vehicle travels for a long time without external charging, and the output of the electric motor is inevitably restricted when the vehicle continues to travel while using the fuel by the internal combustion engine. Accordingly, the driver is prompted to carry out external charging. Therefore, according to this hybrid vehicle, the dependency on the internal combustion engine can be reduced.

The hybrid vehicle disclosed in Japanese Patent Laying-Open No. 8-154307 as described above restricts the operation of the internal combustion engine. Furthermore, in other hybrid vehicles, it is expected that, in the future, with increased capacity of the electricity storage device and even with provision of the external charging function, the electric vehicle mode (EV mode) of traveling only with electricity from the electricity storage device will be mainly used and the operation frequency of other motive power sources (internal combustion engine, fuel cell, and the like) will be reduced.

However, in the motive power sources with less operation frequency, it is likely that good conditions cannot be kept and that discovery of abnormalities is delayed. For example, if a non-operating state of an internal combustion engine continues for a long term, the condition of the internal combustion engine is deteriorated, and moreover, the delayed discovery of abnormalities may lead to a serious failure.

Moreover, if the EV mode is mainly used, the users' desire to enjoy riding by driving other motive power sources (for example, riding by driving the internal combustion engine) may arise.

DISCLOSURE OF THE INVENTION

The present invention is therefore made to solve such problems, and an object of the present invention is to provide a hybrid vehicle capable of forcedly operating a motive power source with reduced operation frequency.

In accordance with the present invention, a hybrid vehicle includes: first and second motive power sources; a control portion being able to switch between a first travel mode (EV mode) of traveling by stopping the second motive power source and a second travel mode (hybrid mode (HV mode)) of traveling using the first and second motive power sources for controlling the first and second motive power sources according to the selected first or second travel mode; and an input device for switching a travel mode to the second travel mode during traveling in the first travel mode.

In the hybrid vehicle in accordance with the present invention, even during traveling in the first travel mode, when the input device is operated by the driver, the travel mode is switched from the first travel mode to the second travel mode, whereby the second motive power source is driven.

Therefore, according to the hybrid vehicle in accordance with the present invention, the driver operates the input device as appropriate so that the second motive power source can be kept in a good condition. In addition, an abnormality in the second motive power source can be discovered at an early stage, if it occurs. Moreover, the users' desire to enjoy riding by driving the second motive power source can be satisfied.

Preferably, the first motive power source includes a first electric rotating machine and an electricity storage device supplying electric power to the first electric rotating machine. The second motive power source includes an internal combustion engine. The first travel mode is an electric vehicle mode (EV mode) of traveling by stopping the internal combustion engine and driving the first electric rotating machine, and the second travel mode is a hybrid mode (HV mode) of traveling by driving the first electric rotating machine and the internal combustion engine.

In this hybrid vehicle, even during traveling in the electric vehicle mode, when the input device is operated by the driver, the travel mode is switched from the electric vehicle mode to the hybrid mode, whereby the internal combustion engine is driven. Therefore, according to this hybrid vehicle, the internal combustion engine can be kept in a good condition. In addition, an abnormality in the internal combustion engine can be discovered at an early stage, if it occurs. Moreover, the users' desire to enjoy riding by driving the internal combustion engine can be satisfied.

Preferably, the first motive power source includes an electric rotating machine and an electricity storage device capable of supplying electric power to the electric rotating machine. The second motive power source includes a fuel cell capable of supplying electric power to the electric rotating machine. The first travel mode is an electric vehicle mode (EV mode) of traveling by stopping the fuel cell and driving the electric rotating machine using electric power from the electricity storage device, and the second travel mode is a hybrid mode (HV mode) of traveling by driving the electric rotating machine using electric power from the fuel cell and the electricity storage device.

In this hybrid vehicle, even during traveling in the electric vehicle mode, when the input device is operated by the driver, the travel mode is switched from the electric vehicle mode to the hybrid mode, whereby electric power from the fuel cell is supplied to the electric rotating machine. Therefore, according to this hybrid vehicle, the fuel cell can be kept in a good condition. In addition, an abnormality in the fuel cell can be discovered at an early stage, if it occurs.

Preferably, the hybrid vehicle further includes an electric power input portion receiving electric power provided from an outside of the vehicle for charging the electricity storage device.

In this hybrid vehicle, the electricity storage device can be charged from the electric power input portion using an electric power supply outside of the vehicle, so that the occasion of traveling in the electric vehicle mode (EV mode) can be increased, thereby reducing fuel consumption by the second motive power source. However, on the other hand, the aforementioned problem resulting from the prolonged non-operating time of the second motive power source is more conspicuous. Then, the provision of the input device capable of switching from the electric vehicle mode to the hybrid mode (HV mode) allows the second motive power source to be driven as appropriate. Therefore, according to this hybrid vehicle, the fuel consumption by the second motive power source can be restrained, while leaving the second motive power source in the non-operating state for a long time can be prevented.

Preferably, the hybrid vehicle further includes: a timer portion counting a non-operating time of the second motive power source; and a notification portion prompting a driver to operate the input device when the non-operating time is equal to or longer than a first prescribed time.

In this hybrid vehicle, when the non-operating time of the second motive power source is equal to or longer than the first prescribed time, the driver is prompted to operate the input device by the notification portion, thereby preventing the driver from forgetting about operating the input device. Therefore, according to this hybrid vehicle, leaving the second motive power source in the non-operating state for a long time can be prevented.

Preferably, the control portion switches the travel mode from the first travel mode (EV mode) to the second travel mode (HV mode) when the non-operating time of the second motive power source is equal to or longer than a second prescribed time which is longer than the first prescribed time.

In this hybrid vehicle, when the non-operating time of the second motive power source is equal to or longer than the second prescribed time which is longer than the first prescribed time, the travel mode is forcedly switched from the first travel mode to the second travel mode by the control portion, whereby the second motive power source is driven. Therefore, according to this hybrid vehicle, leaving the second motive power source in the non-operating state for a long time can be prevented reliably.

Preferably, when an operating time of the second motive power source is shorter than a third prescribed time, the timer portion counts the non-operating time, assuming that a non-operating state of the second motive power source continues.

In this hybrid vehicle, when the second motive power source operates for such a short time that cannot contribute to keeping the second motive power source in a good condition or making an abnormality in the second motive power source apparent, the second motive power source is assumed as being in the non-operating state even when the second motive power source is actually operated. Therefore, according to this hybrid vehicle, the driver can be notified of the timing to drive the second motive power source, as appropriate.

Preferably, the hybrid vehicle further includes a detection portion detecting a remaining amount of energy of the second motive power source. When the remaining amount of energy is lower than a prescribed amount, the control portion halts switching from the first travel mode (EV mode) to the second travel mode (HV mode).

In this hybrid vehicle, when the remaining amount of energy of the second motive power source is low, the control portion does not perform switching from the first travel mode to the second travel mode, thereby avoiding such a situation in that the second motive power source is driven irrespective of a low remaining amount of energy of the second motive power source. Therefore, according to this hybrid vehicle, unnecessary travel-mode switching can be prevented.

Preferably, the hybrid vehicle further includes: an electric power input portion receiving electric power provided from an outside of the vehicle for charging the electricity storage device; a second electric rotating machine generating electric power using an output of the internal combustion engine and being able to supply the generated electric power to the electricity storage device; first and second inverters provided respectively corresponding to the first and second electric rotating machines; and an inverter control portion controlling the first and second inverters. The first and second electric rotating machines respectively include first and second three-phase coils as stator coils. The electric power input portion includes a first terminal connected to a neutral point of the first three-phase coil, and a second terminal connected to a neutral point of the second three-phase coil. The inverter control portion controls the first and second inverters such that alternating-current power provided to the first and second terminals is converted into direct-current power to be provided to the electricity storage device.

In this hybrid vehicle, using the first and second electric rotating machines, the first and second inverters provided respectively corresponding to them, and the inverter control portion, charging of the electric storage device from the outside is realized. Therefore, according to this hybrid vehicle, it is not necessary to separately provide an external charging device, thereby realizing a size reduction of the vehicle and improved fuel efficiency because of the weight reduction.

As described above, the present invention allows the second motive power source to be driven by switching to the second travel mode (HV mode) during traveling in the first travel mode (EV mode), so that the second motive power source can be kept in a good condition. In addition, an abnormality in the second motive power source can be discovered at an early stage, if it occurs. Moreover, the users' desire to enjoy riding by driving the second motive power source can be satisfied.

BEST MODES FOR CARRYING OUT THE INVENTION

Figure 1:
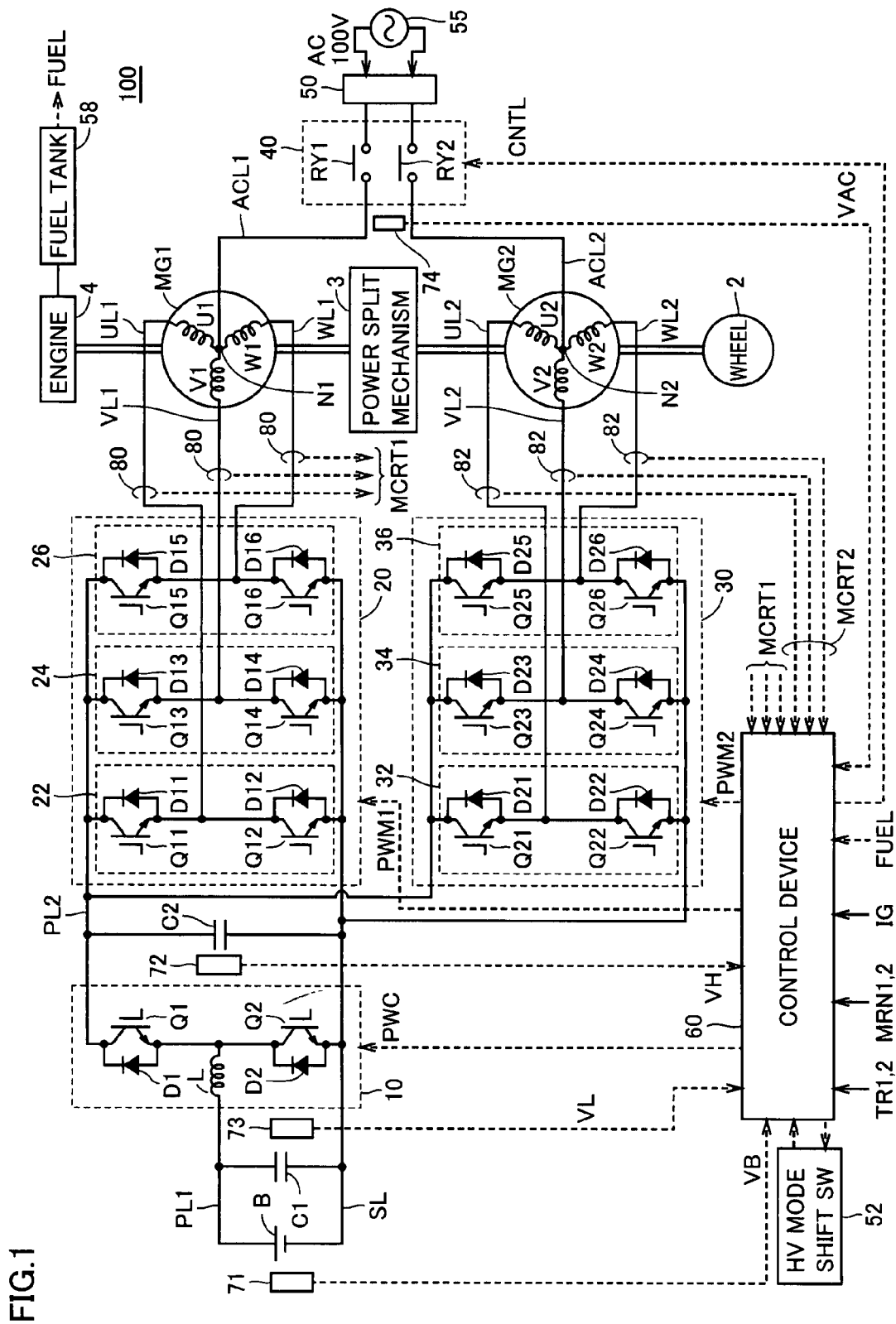
FIG. 1 is an entire block diagram of a hybrid vehicle in accordance with a first embodiment of this invention.

In the following, the embodiments of the present invention will be described with reference to the figures. It is noted that in the figures the same or corresponding parts will be denoted with the same reference characters and the description thereof will not be repeated.

First Embodiment

FIG. 1 is an entire block diagram of a hybrid vehicle in accordance with a first embodiment of the present invention. Referring to FIG. 1, a hybrid vehicle 100 includes an electricity storage device B, a boost converter 10, inverters 20, 30, power supply lines PL1, PL2, a ground line SL, U-phase lines UL1, UL2, V-phase lines VL1, VL2, W-phase lines WL1, WL2, motor generators MG1, MG2, an engine 4, a fuel tank 58, a power split mechanism 3, and a wheel 2.

Engine 4 receives supply of fuel from fuel tank 58 to generate motive power. Fuel tank 58 supplies fuel to engine 4. Fuel tank 58 also detects the remaining amount of fuel and outputs a signal FUEL indicating the remaining amount of fuel to a control device 60 as described later.

Power split mechanism 3 is a mechanism that is linked to engine 4 and motor generators MG1, MG2 to split power therebetween. For example, as power split mechanism 3, a planetary gear train having three rotational axes of a sun gear, a planetary carrier, and a ring gear can be used. These three rotational axes are respectively connected to the respective rotational axes of engine 4 and motor generators MG1, MG2. For example, engine 4 and motor generators MG1, MG2 can be mechanically connected to power split mechanism 3 by inserting a crank shaft of engine 4 into the center of a hollow rotor of motor generator MG1.

Here, the rotational axis of motor generator MG2 is linked to wheel 2 by a not-shown reduction gear or differential gear. In addition, a speed reducer for the rotational axis of motor generator MG2 may be incorporated inside power split mechanism 3.

Then, motor generator MG1 is incorporated into hybrid vehicle 100 as operating as a power generator driven by engine 4 and operating as an electric motor that can start engine 4, and motor generator MG2 is incorporated into hybrid vehicle 100 as an electric motor that drives wheel 2 as a driving wheel.

Motor generators MG1, MG2 are three-phase alternating-current motors, for example, three-phase alternating-current synchronous motors. Motor generator MG1 includes a three-phase coil, as a stator coil, including a U-phase coil U1, a V-phase coil V1 and a W-phase coil W1. Motor generator MG2 includes a three-phase coil, as a stator coil, including a U-phase coil U2, a V-phase coil V2 and a W-phase coil W2.

Then, motor generator MG1 generates three-phase alternating voltage using an output of engine 4 and outputs the generated three-phase alternating current to inverter 20. In addition, motor generator MG1 generates driving force by three-phase alternating voltage received from inverter 20 to start engine 4.

Motor generator MG2 generates a driving torque for the vehicle by three-phase alternating voltage received from inverter 30. In addition, motor generator MG2 generates and outputs three-phase alternating voltage to inverter 30 at a time of regenerative braking of the vehicle.

Electricity storage device B is a rechargeable, direct-current power supply and, for example, is formed of a nickel metal hydride or lithium-ion secondary battery. Electricity storage device B outputs direct-current power to boost converter 10. Electricity storage device B is charged by direct-current voltage output from boost converter 10. Here, a large-capacitance capacitor may be used as electricity storage device B.

Boost converter 10 includes a reactor L, npn-type transistors Q1, Q2, and diodes D1, D2. Reactor L has one end connected to power supply line PL1 and the other end connected to a connection point between npn-type transistors Q1 and Q2. The npn-type transistors Q1, Q2 are connected in series between power supply line PL2 and ground line SL and receive a signal PWC from control device 60 at the bases. Then, diodes D1, D2 are respectively connected between the collector and the emitter of each of npn-type transistors Q1, Q2 so that current flows from the emitter side to the collector side.

It is noted that, for example, IGBT (Insulated Gate Bipolar Transistor) may be used as the aforementioned npn-type transistor and npn-type transistors below in this description, and a power switching element such as a power MOSFET (metal oxide semiconductor field-effect transistor) may be used in place of the npn-type transistor.

Inverter 20 includes a U-phase arm 22, a V-phase arm 24 and a W-phase arm 26. U-phase arm 22, V-phase arm 24 and W-phase arm 26 are connected in parallel between power supply line PL2 and ground line SL.

U-phase arm 22 includes npn-type transistors Q11, Q12 connected in series, V-phase arm 24 includes npn-type transistors Q13, Q14 connected in series, and W-phase arm 26 includes npn-type transistors Q15, Q16 connected in series. Diodes D11-D16 are respectively connected between the collector and the emitter of each of npn-type transistors Q11-Q16 to feed current from the emitter side to the collector side. Then, a connection point of each npn-type transistor in each phase arm is respectively connected to a coil end of each phase coil of motor generator MG1 different from a neutral point N1 through each of U, V, W-phase lines UL1, VL1, WL1.

Inverter 30 includes a U-phase arm 32, a V-phase arm 34 and a W-phase arm 36. U-phase arm 32, V-phase arm 34 and W-phase arm 36 are connected in parallel between power supply line PL2 and ground line SL.

U-phase arm 32 includes npn-type transistors Q21, Q22, V-phase arm 34 includes npn-type transistors Q23, Q24 connected in series, and W-phase arm 36 includes npn-type transistors Q25, Q26 connected in series. Diodes D21-D26 are respectively connected between the collector and the emitter of each of npn-type transistors Q21-Q26 to feed current from the emitter side to the collector side. Then, also in inverter 30, the connection point of each npn-type transistor in each phase arm is respectively connected to a coil end of each phase coil of motor generator MG2 different from a neutral point N2 through each of U, V, W-phase lines UL2, VL2, WL2.

Hybrid vehicle 100 further includes capacitors C1, C2, a relay circuit 40, a connector 50, an HV mode shift switch 52, control device 60, AC lines ACL1, ACL2, voltage sensors 71-74, and current sensors 80, 82.

Capacitor C1 is connected between power supply line PL1 and ground line SL to reduce an effect on electricity storage device B and boost converter 10 by voltage variations. A voltage VL between power supply line PL1 and ground line SL is measured by voltage sensor 73.

Capacitor C2 is connected between power supply line PL2 and ground line SL to reduce an effect on inverters 20, 30 and boost converter 10 by voltage variations. A voltage VH between power supply line PL2 and ground line SL is measured by voltage sensor 72.

Boost converter 10 boosts direct-current voltage supplied from electricity storage device B through power supply line PL1 for output to power supply line PL2. More specifically, boost converter 10 performs a boost operation by accumulating current flowing according to a switching operation of npn-type transistor Q2 in reactor L as magnetic field energy, based on signal PWC from control device 60, and discharging the accumulated energy by feeding current to power supply line PL2 through diode D1 in synchronization with a timing at which npn-type transistor Q2 is turned off.

In addition, boost converter 10 charges electricity storage device B by lowering the direct-current voltage received from either or both of inverters 20 and 30 through power supply line PL2 to the voltage level of electricity storage device B, based on signal PWC from control device 60.

Inverter 20 converts the direct-current voltage supplied from power supply line PL2 to three-phase alternating voltage to drive motor generator MG1, based on a signal PWM1 from control device 60. Accordingly, motor generator MG1 is driven to generate a torque designated by a torque command value TR1. Furthermore, inverter 20 converts the three-phase alternating voltage generated by motor generator MG1 which receives the output from engine 4 to direct-current voltage based on signal PWM1 from control device 60 to output the converted direct-current voltage to power supply line PL2.

Inverter 30 converts the direct-current voltage supplied from power supply line PL2 into three-phase alternating voltage to drive motor generator MG2, based on a signal PWM2 from control device 60. Accordingly, motor generator MG2 is driven to generate a torque designated by a torque command value TR2. Furthermore, at a time of regenerative braking of the vehicle, inverter 30 converts the three-phase alternating voltage generated by motor generator MG2 which receives a rotational force from a driving shaft based on signal PWM2 from control device 60 to output the converted direct-current voltage to power supply line PL2.

It is noted that regenerative braking referred to herein includes braking involving regenerative electric power generation in a case of a foot braking operation by the driver of hybrid vehicle 100, and decelerating (or stopping accelerating) the vehicle during regenerative electric power generation by letting off the accelerator pedal during travel while the foot brake is not operated.

Relay circuit 40 includes relays RY1, RY2. For example, a mechanical contact relay may be used as relay RY1, RY2, though a semiconductor relay may be used. Relay RY1 is provided between AC line ACL1 and connector 50 and is turned on/off in response to a signal CNTL from control device 60. Relay RY2 is provided between AC line ACL2 and connector 50 and is turned on/off in response to signal CNTL from control device 60.

This relay circuit 40 performs connection/disconnection between AC lines ACL1, ALC2 and connector 50 in response to signal CNTL from control device 60. In other words, relay circuit 40 electrically connects AC lines ACL1, ACL2 with connector 50 when receiving signal CNTL at H (logic high) level from control device 60, and electrically disconnects AC lines ACL1, ACL 2 from connector 50 when receiving signal CNTL at L (logic low) level from control device 60.

Connector 50 includes not-shown first and second terminals for receiving alternating-current power from a commercial power supply 55 outside of the vehicle. First and second terminals are respectively connected to relays RY1, RY2 of relay circuit 40. Line voltage VAC of AC lines ACL1, ACL2 is measured by voltage sensor 74 and the measured value is transmitted to control device 60.

HV mode shift switch 52 is a switch for the driver to switch the travel mode from EV mode to HV mode during traveling in EV mode. Here, EV mode is a travel mode of traveling by electric power using electricity storage device B and motor generator MG2 as motive power sources by stopping engine 4 and motor generator MG1. On the other hand, HV mode is a travel mode of traveling using engine 4, electricity storage device B and motor generator MG2 as motive power sources by driving engine 4 and motor generator MG1.

Then, upon an on-operation by the driver, HV mode shift switch 52 outputs an H level signal to control device 60. HV mode shift switch 52 is configured to be illuminable and illuminates in response to an illumination command from control device 60.

Voltage sensor 71 detects voltage VB of electricity storage device B and outputs the detected voltage VB to control device 60. Voltage sensor 73 detects a voltage between opposite ends of capacitor C1, that is, input voltage VL of boost converter 10, and outputs the detected voltage VL to control device 60. Voltage sensor 72 detects a voltage between opposite ends of capacitor C2, that is, output voltage VH of boost converter 10 (corresponding to the input voltage of inverters 20, 30. The same will be applied in the following.), and outputs the detected voltage VH to control device 60.

Current sensor 80 detects motor current MCRT1 flowing in motor generator MG1 and outputs the detected motor current MCRT1 to control device 60. Current sensor 82 detects motor current MCRT2 flowing in motor generator MG2 and outputs the detected motor current MCRT2 to control device 60.

Control device 60 generates signal PWC for driving boost converter 10, based on torque command values TR1, TR2 and motor rotational speeds MRN1, MRN2 of motor generators MG1, MG2 output from a not-shown HV-ECU (Electronic Control Unit), voltage VL from voltage sensor 73, and voltage VH from voltage sensor 72, and outputs the generated signal PWC to boost converter 10.

Furthermore, control device 60 generates signal PWM1 for driving motor generator MG1, based on motor current MCRT1 and torque command value TR1 of motor generator MG1 and voltage VH, and outputs the generated signal PWM1 to inverter 20. In addition, control device 60 generates signal PWM2 for driving motor generator MG2, based on motor current MCRT2 and torque command value TR2 of motor generator MG2 and voltage VH, and outputs the generated signal PWM2 to inverter 30.

Here, control device 60 generates signals PWM1, PWM2 for controlling inverters 20, 30 so that electricity storage device B is charged by converting alternating-current power from commercial power supply 55 applied to neutral points N1 and N2 of motor generators MG1 and MG2 into direct-current power, based on a signal IG from a not-shown ignition key (or ignition switch. The same will be applied in the following.) and SOC of electricity storage device B.

In addition, control device 60 determines whether charging from the outside of the vehicle is possible or not based on SOC of electricity storage device B, and if determining that charging is possible, outputs signal CNTL at H level to relay circuit 40. On the other hand, if determining that electricity storage device B is in an almost fully charged state and not chargeable, control device 60 outputs signal CNTL at L level to relay circuit 40, and stops inverters 20 and 30 if signal IG indicates a stop state.

Furthermore, when receiving an H level signal from HV mode shift switch 52 during traveling in EV mode, control device 60 shifts the travel mode from EV mode to HV mode under prescribed conditions by a method as described later. Specifically, control device 60 starts engine 4 which has been stopped and allows hybrid traveling using engine 4 and motor generator MG2 as motive power sources.

Moreover, when a non-operating time of engine 4 exceeds a prescribed time as preset, control device 60 prompts the driver to shift from EV mode to HV mode by illuminating HV mode shift switch 52 under prescribed conditions by a method as described later. Then, control device 60 forcedly shifts the travel mode from EV mode to HV mode when HV mode shift switch 52 is not operated by the driver although HV mode shift switch 52 is illuminated.

Now, control of boost inverter 10 and inverters 20, 30 by control device 60 and control of charging from commercial power supply 55 will be described. In the following FIG. 2-FIG. 7, a description will be made by extracting only the part related to these controls, and the travel mode shift control by control device 60 will be described after FIG. 8.

Figure 2:
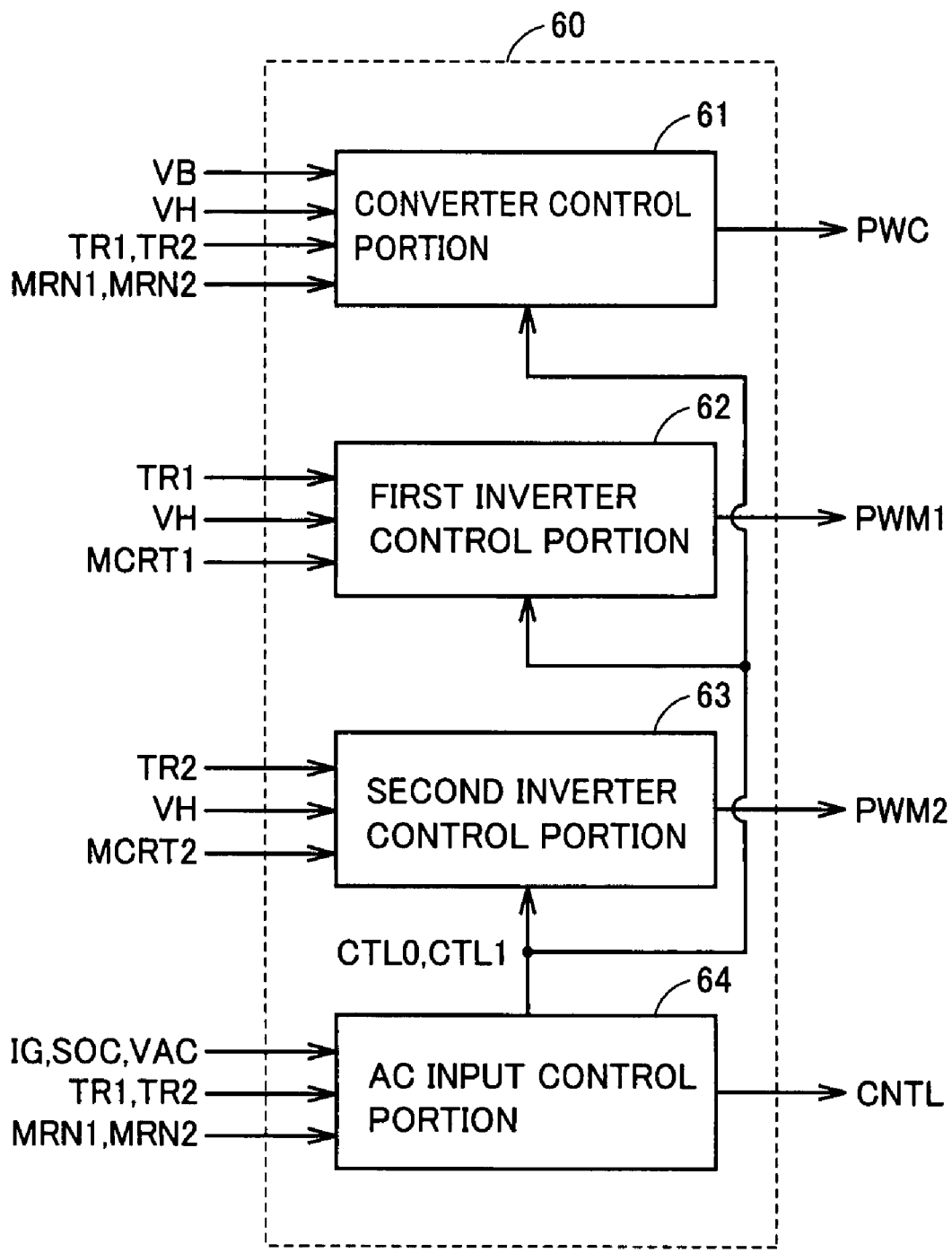
FIG. 2 is a functional block diagram of a control device shown in FIG. 1.

FIG. 2 is a functional block diagram of control device 60 shown in FIG. 1. Referring to FIG. 2, control device 60 includes a converter control portion 61, a first inverter control portion 62, a second inverter control portion 63, and an AC input control portion 64. Converter control portion 61 generates signal PWC for turning on/off npn-type transistors Q1, Q2 of boost converter 10 based on voltage VB, voltage VH, torque command values TR1, TR2, and motor rotational speeds MRN1, MRN2, and outputs the generated signal PWC to boost converter 10.

First inverter control portion 62 generates signal PWM1 for turning on/off npn-type transistors Q11-Q16 of inverter 20 based on torque command value TR1 and motor current MCRT1 of motor generator MG1 and voltage VH, and outputs the generated signal PWM1 to inverter 20.

Second inverter control portion 63 generates signal PWM2 for turning on/off npn-type transistors Q21-Q26 of inverter 30 based on torque command value TR2 and motor current MCRT2 of motor generator MG2 and voltage VH, and outputs the generated signal PWM2 to inverter 30.

AC input control portion 64 determines the driving state of motor generators MG1, MG2 based on torque command values TR1, TR2 and motor rotational speeds MRN1, MRN2, controls two inverters 20, 30 cooperatively to convert and boost the alternating voltage applied to connector 50 into direct current based on signal IG and SOC of electricity storage device B, and performs charging of electricity storage device B.

Then, when it is determined that the driving state of motor generators MG1, MG2 is a stop state and that the ignition key is turned to an OFF position based on signal IG, AC input control portion 64 performs a charging operation, if SOC of electricity storage device B is lower than a prescribed level. Specifically, AC input control portion 64 renders relays RY1, RY2 conductive by outputting signal CNTL at H level to relay circuit 40. Then, AC input control portion 64 generates a control signal CTL1 in response to voltage VAC, if it is input, and controls inverters 20, 30 cooperatively to allow the alternating voltage applied to connector 50 to be converted into direct current and boosted and allow charging of electricity storage device B.

On the other hand, when it is determined that motor generators MG1, MG2 are in a drive state or that the ignition key is turned to an ON position based on signal IG, and when SOC of electricity storage device B is higher than a prescribed level, AC input control portion 64 does not perform a charging operation. Specifically, AC input control portion 64 allows relays RY1, RY2 to be opened by outputting signal CNTL at L level to relay circuit 40, and generates a control signal CTL0 to allow boost converter 10 and inverters 20, 30 to perform a normal operation at the time of driving the vehicle.

Figure 3:
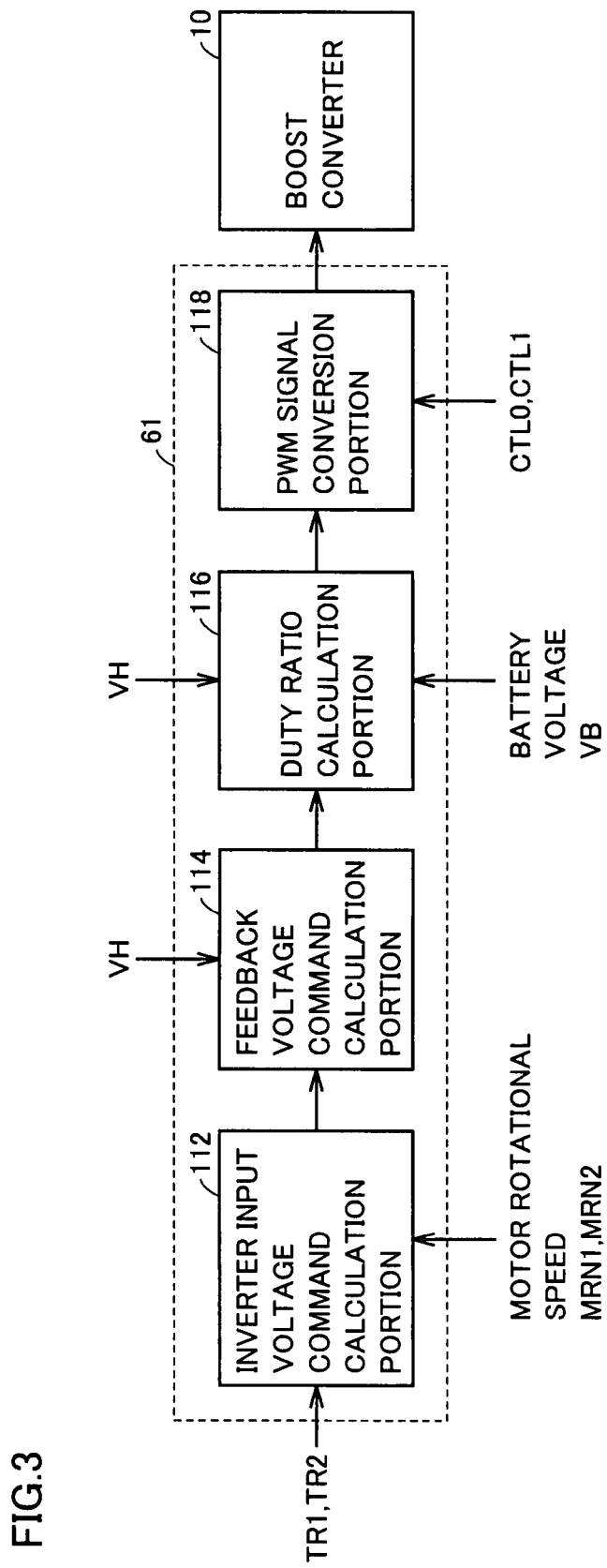
FIG. 3 is a functional block diagram of a converter control portion shown in FIG. 2.

FIG. 3 is a functional block diagram of converter control portion 61 shown in FIG. 2. Referring to FIG. 3, converter control portion 61 includes an inverter input voltage command calculation portion 112, a feedback voltage command calculation portion 114, a duty ratio calculation portion 116, and a PWM signal conversion portion 118.

Inverter input voltage command calculation portion 112 calculates the optimum value (target value) of the inverter input voltage, that is, a voltage command VH_com, based on torque command values TR1, TR2 and motor rotational speeds MRN1, MRN 2, and outputs the calculated voltage command VH_com to feedback voltage command calculation portion 114.

Feedback voltage command calculation portion 114 calculates a feedback voltage command VH_com_fb for controlling output voltage VH to voltage command VH_com, based on output voltage VH of boost converter 10 detected by voltage sensor 72 and voltage command VH_com from inverter input voltage command calculation portion 112, and outputs the calculated feedback voltage command VH_com_fb to duty ratio calculation portion 116.

Duty ratio calculation portion 116 calculates a duty ratio for controlling output voltage VH of boost converter 10 to voltage command VH_com, based on voltage VB from voltage sensor 71 and feedback voltage command VH_com_fb from feedback voltage command calculation portion 114, and outputs the calculated duty ratio to PWM signal conversion portion 118.

PWM signal conversion portion 118 generates PWM (Pulse Width Modulation) signal for turning on/off npn-type transistors Q1, Q2 of boost converter 10 based on the duty ratio received from duty ratio calculation portion 116, and outputs the generated PWM signal as signal PWC to npn-type transistors Q1, Q2 of boost converter 10.

Here, the power accumulation in reactor L is increased by increasing ON duty of npn-type transistor Q2 in the lower arm of boost converter 10, so that a higher voltage output can be obtained. On the other hand, the voltage on power supply line PL2 is lowered by increasing ON duty of npn-type transistor Q1 in the upper arm. Then, by controlling the duty ratio of npn-type transistors Q1, Q2, the voltage on power supply line PL2 can be controlled to any given voltage higher than the output voltage of. electricity storage device B.

In addition, PWM signal conversion portion 118 brings npn-type transistor Q1 into a conducting state and brings npn-type transistor Q2 into a non-conducting state, irrespective of the output of duty ratio calculation portion 116, when control signal CTL1 is activated. Accordingly, it becomes possible to feed charging current from power supply line PL2 toward power supply line PL1.

Figure 4:
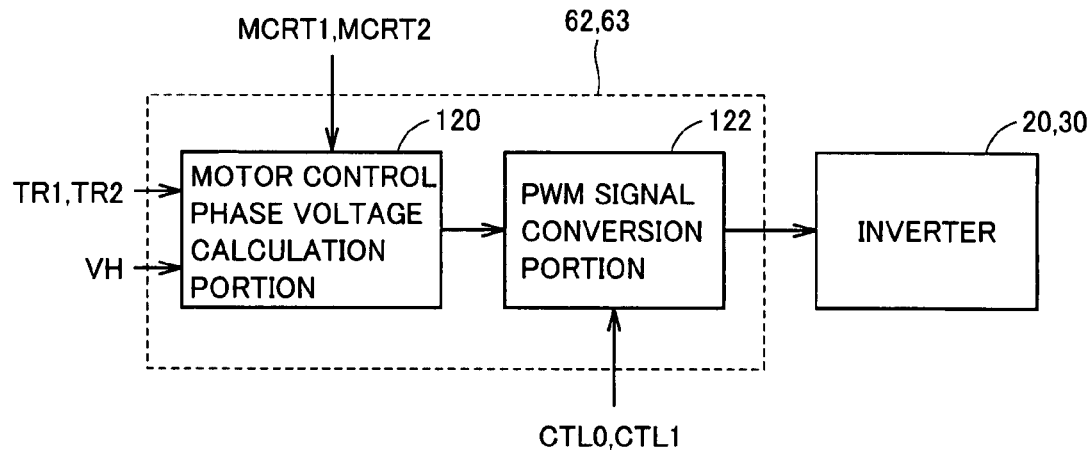
FIG. 4 is a functional block diagram of first and second inverter control portions shown in FIG. 2.

FIG. 4 is a functional block diagram of first and second inverter control portions 62, 63 shown in FIG. 2. Referring to FIG. 4, each of first and second inverter control portions 62, 63 includes a motor control phase voltage calculation portion 120 and a PWM signal conversion portion 122.

Motor control phase voltage calculation portion 120 receives input voltage VH of inverters 20, 30 from voltage sensor 72, receives motor current MCRT1 (or MCRT2) flowing in each phase of motor generator MG1 (or MG2) from current sensor 80 (or 82), and receives torque command value TR1 (or TR2) from HV-ECU. Then, motor control phase voltage calculation portion 120 calculates a voltage applied to each phase coil of motor generator MG1 (or MG2) based on these input values, and outputs the calculated, each phase coil voltage to PWM signal conversion portion 122.

When receiving control signal CTL0 from AC input control portion 64, PWM signal conversion portion 122 generates a signal PWM1_0 (a kind of signal PWM1) (or PWM2_0 (a kind of signal PWM2)) for actually turning on/off each of npn-type transistors Q11-Q16 (or Q21-Q26) of inverter 20 (or 30), based on each phase coil voltage command received from motor control phase voltage calculation portion 120, and outputs the generated signal PWM1_0 (or PWM2_0) to each of npn-type transistors Q11-Q16 (or Q21-Q26) of inverter 20 (or 30).

In this manner, the switching control is performed on each of npn-type transistors Q11-Q16 (or Q21-Q26), and the current fed to each phase of motor generator MG1 (or MG2) is controlled so that motor generator MG1 (or MG2) outputs the torque according to the command. As a result, a motor torque corresponding to torque command value TR1 (or TR2) is output.

On the other hand, when receiving control signal CTL1 from AC input control portion 64, PWM signal conversion portion 122 generates a signal PWM1_1 (a kind of signal PWM1) (or PWM2_1 (a kind of signal PWM2)) for turning on/off npn-type transistors Q11-Q16 (or Q21-Q26) so as to feed alternating current of the same phase to U-phase arm 22 (or 32), V-phase arm 24 (or 34) and W-phase arm 26 (or 36) of inverter 20 (or 30), irrespective of the output of motor control phase voltage calculation portion 120, and outputs the generated signal PWM1_1 (or PWM2_1) to npn-type transistors Q11-Q16 (or Q21-Q26) of inverter 20 (or 30).

In the case where alternating current of the same phase flows in each of U, V, W phase coils, a rotational torque is not generated in motor generators MG1, MG2. Then, inverters 20 and 30 are controlled cooperatively, so that alternating voltage VAC is converted into direct-current charging voltage.

Now, a method of generating direct-current charging voltage from commercial power supply 55 outside the vehicle (the voltage level is assumed as alternating voltage VAC) in hybrid vehicle 100 will be described.

Figure 5:
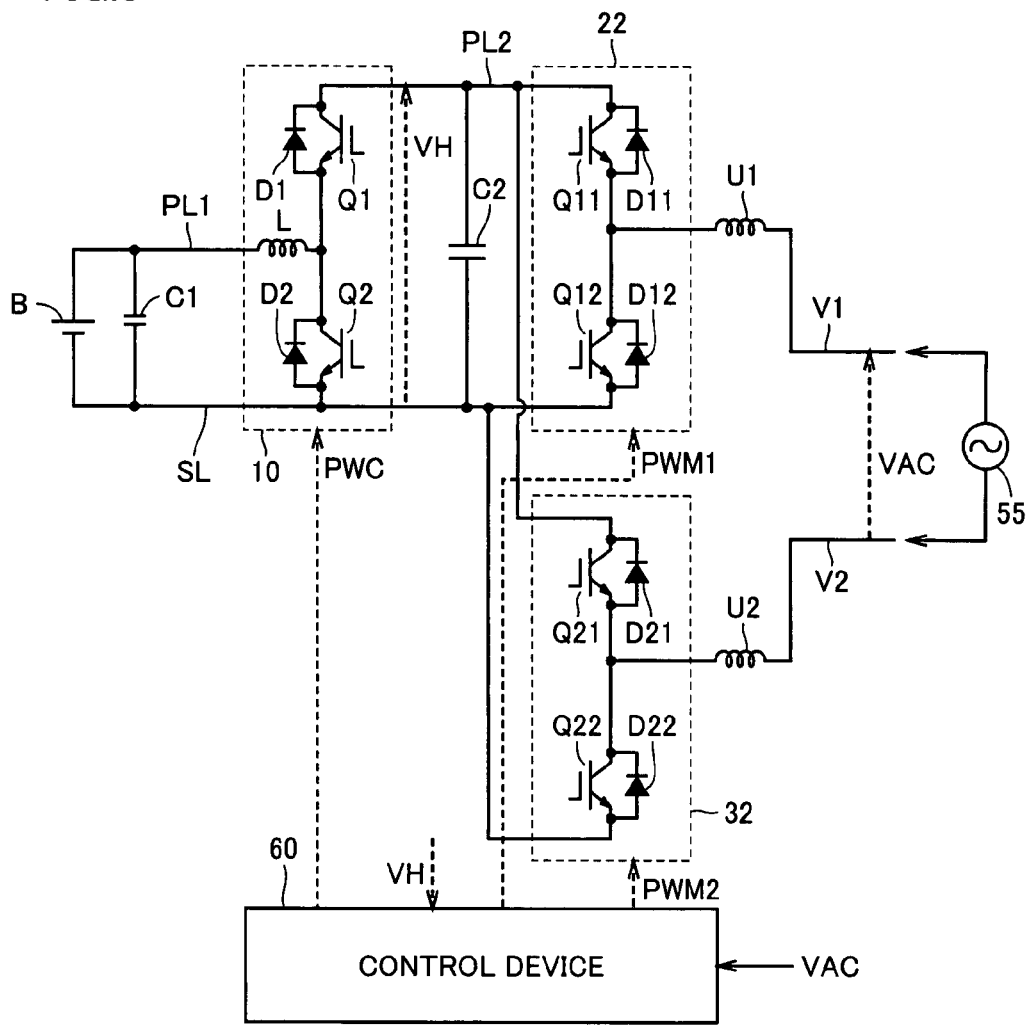
FIG. 5 is a simplified diagram of the block diagram in FIG. 1 showing a part related to charging.

FIG. 5 is a simplified diagram of the block diagram in FIG. 1 showing the part related to charging. In FIG. 5, the U-phase arms of inverters 20 and 30 in FIG. 1 are representatively shown. Furthermore, the U-phase coil of three phase coils of the motor generator is representatively shown. The U-phase is representatively illustrated, since current of the same phase is fed in each phase coil and therefore the other two phase circuits act in the same manner as the U-phase. As can be understood from FIG. 5, a pair of U-phase coil U1 and U-phase arm 22 and a pair of U-phase coil U2 and U-phase arm 32 each have a similar configuration as boost converter 10. Therefore, for example, not only conversion of alternating voltage of 100V into direct-current voltage but also conversion into a further boosted charging voltage of, for example, about 200V is possible.

Figures 6, 7:
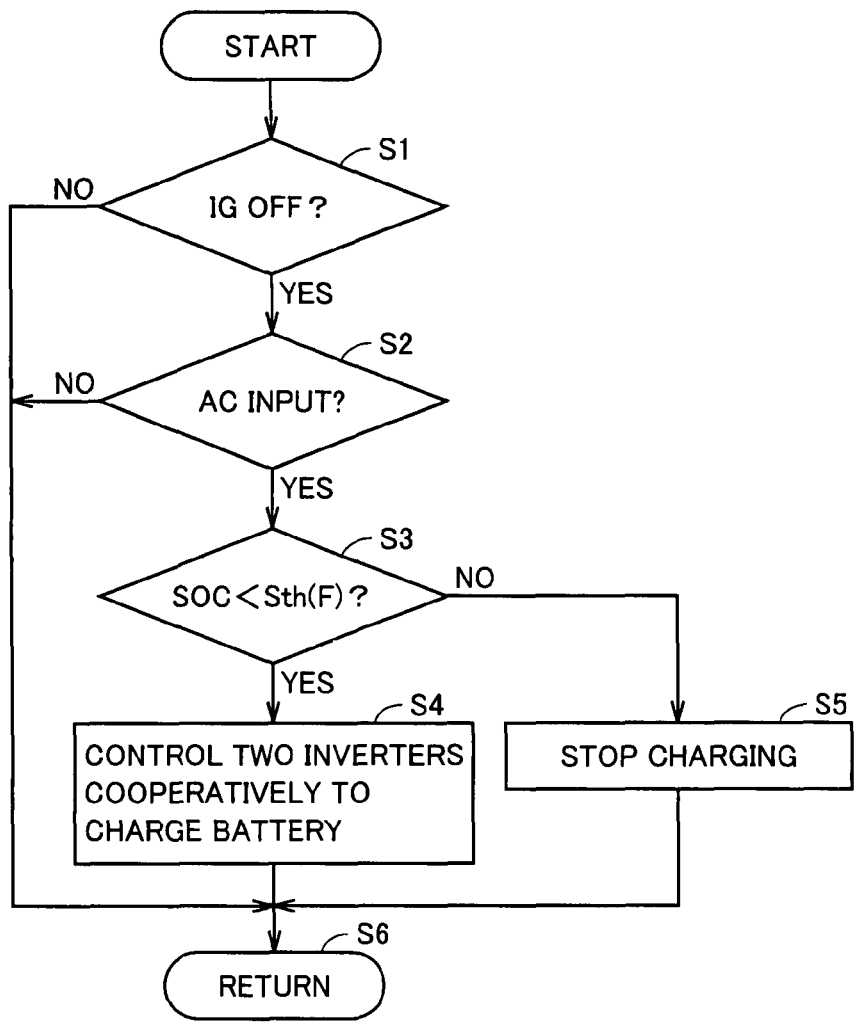
FIG. 6 is a diagram showing control states of transistors at a time of charging.
FIG. 7 is a flowchart showing a control structure of a program for determination of start of charging by the control device shown in FIG. 1.

FIG. 6 shows control states of transistors at a time of charging. Referring to FIG. 5 and FIG. 6, first, when voltage VAC>0, that is, voltage V1 on AC line ACL1 is higher than voltage V2 on AC line ALC2, npn-type transistor Q1 of boost converter 10 is brought into ON state and npn-type transistor Q2 is brought into OFF state. Accordingly, boost converter 10 can feed charging current from power supply line PL2 toward power supply line PL1.

Then, in the first inverter (inverter 20), npn-type transistor Q12 is switched with a cycle and a duty ratio corresponding to voltage VAC, and npn-type transistor Q11 is controlled in OFF state or a switching state of being rendered conductive in synchronization with conduction of diode D11. At this point, in the second inverter (inverter 30), npn-type transistor Q21 is brought into OFF state, and npn-type transistor Q22 is controlled in ON state.

If voltage VAC>0, in ON state of npn-type transistor Q12, current flows through a path of coil U1→npn-type transistor Q12→diode D22→coil U2. Here, the energy accumulated in coils U1, U2 is discharged when npn-type transistor Q12 enters OFF state, and current is fed through diode D11 to power supply line PL2. In order to reduce loss by diode D11, npn-type transistor Q11 may be rendered conductive in synchronization with the conduction period of diode D11. A boost ratio is obtained based on the values of voltage VAC and voltage VH, and the switching cycle and the duty ratio of npn-type transistor Q12 are obtained.

Next, if voltage VAC<0, that is, if voltage V1 on AC line ACL1 is lower than voltage V2 on AC line ACL2, npn-type transistor Q1 of the boost converter is brought into ON state, and npn-type transistor Q2 is brought into OFF state. Accordingly, boost converter 10 can feed charging current from power supply line PL2 toward power supply line PL1.

Then, in the second inverter, npn-type transistor Q22 is switched with a cycle and a duty ratio corresponding to voltage VAC, and npn-type transistor Q21 is controlled in OFF state or a switching state of being rendered conductive in synchronization with conduction of diode D21. At this point, in the first inverter, npn-type transistor Q11 is brought into OFF state, and npn-type transistor Q12 is controlled in ON state.

If voltage VAC<0, in ON state of npn-type transistor Q22, current flows through a path of coil U2→npn-type transistor Q22→diode D12→coil U1. Here, the energy accumulated in coils U1, U2 is discharged when npn-type transistor Q22 enters OFF state, and current is fed through diode D21 to power supply line PL2. In order to reduce loss by diode D21, npn-type transistor Q21 may be rendered conductive in synchronization with the conduction period of diode D21. Also here, a boost ratio is obtained based on the values of voltage VAC and voltage VH, and the switching cycle and the duty ratio of npn-type transistor Q22 are obtained.

FIG. 7 is a flowchart showing a control structure of a program for determination of start of charging by control device 60 shown in FIG. 1. The process of this flowchart is invoked from a main routine for execution every certain time or every time prescribed conditions are met.

Referring to FIG. 7, control device 60 determines whether or not the ignition key is turned to OFF position, based on signal IG from the ignition key (step S1). If control device 60 determines that the ignition key is not turned to OFF position (NO in step S1), the process proceeds to step S6 since it is inappropriate to connect a charging cable to the vehicle for charging, and the control goes to the main routine.

If it is determined in step S1 that the ignition key is turned to OFF position (YES in step S1), it is determined that it is appropriate to perform charging, and the process proceeds to step S2. In step S2, relays RY1 and RY2 are controlled from a non-conducting state to a conducting state, and voltage VAC is measured by voltage sensor 74. Then, if alternating voltage is not observed, it is assumed that a charging cable is not connected to a socket of connector 50, so that the process proceeds to step S6 without performing a charging process, and the control goes to the main routine.

On the other hand, if alternating voltage is observed as voltage VAC in step S2, the process proceeds to step S3. In step S3, it is determined whether SOC of electricity storage device B is smaller than a threshold value Sth (F) representing a fully charged state.

If SOC of electricity storage device B<Sth (F) holds, which means a chargeable state, then the process proceeds to step S4. In step S4, control device 60 controls the two inverters cooperatively for charging electricity storage device B.

When SOC of electricity storage device B<Sth (F) does not hold in step S3, electricity storage device B is in a fully charged state and charging is thus unnecessary. The process then proceeds to step S5. In step S5, a charging stop process is performed. Specifically, inverters 20, 30 are stopped, relays RY1, RY2 are opened so that an input of alternating-current power to hybrid vehicle 100 is interrupted. Then, the process proceeds to step S6, and the control returns to the main routine.

Now, a travel mode shift control by control device 60 will be described.

Figure 8:
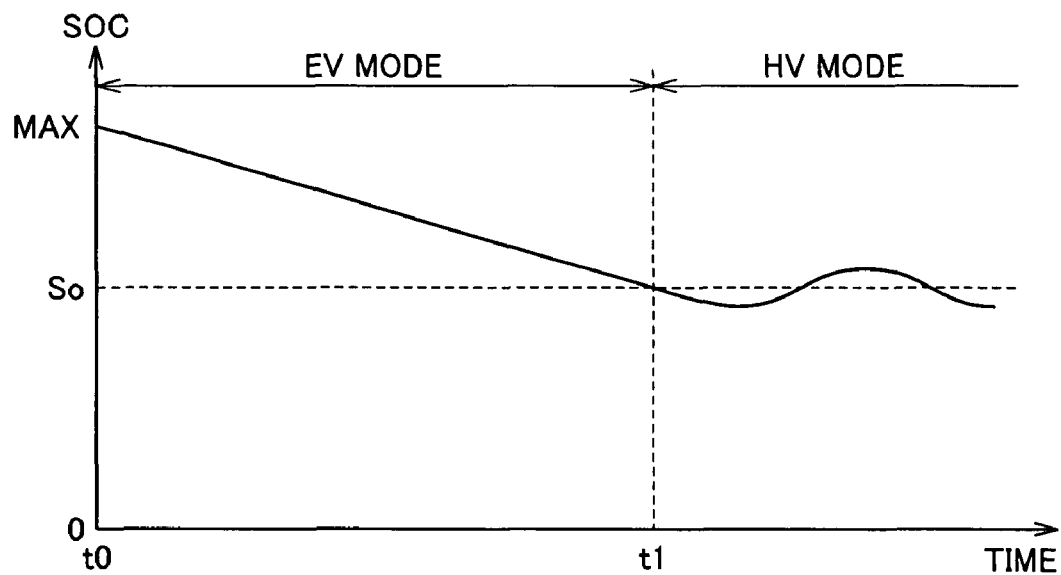
FIG. 8 is a graph showing a normal change of SOC of an electricity storage device shown in FIG. 1.

FIG. 8 is a graph showing a normal change of SOC of electricity storage device B shown in FIG. 1. Referring to FIG. 8, the axis of ordinates represents SOC of electricity storage device B and the axis of abscissas represents the elapsed time. Furthermore, So indicates a control target of SOC of electricity storage device B.

It is assumed that, at time t0, hybrid vehicle 100 starts traveling from the fully charged state of electricity storage device B. Until SOC of electricity storage device B reaches control target So at time t1, engine 4 and motor generator MG1 are stopped, and traveling is performed in EV mode of traveling by driving motor generator MG2 using electricity stored in electricity storage device B.

After time t1 has passed and when SOC of electricity storage device B falls below control target So, engine 4 starts, and the driving force for the vehicle is obtained using the output of engine 4. In addition, electric power generation is performed by motor generator MG1, and SOC of electricity storage device B is controlled to control target So. In other words, after time t1 has passed, the traveling is performed in HV mode of traveling using electricity storage device B, motor generator MG2 and engine 4 as motive power sources.

Figure 9:
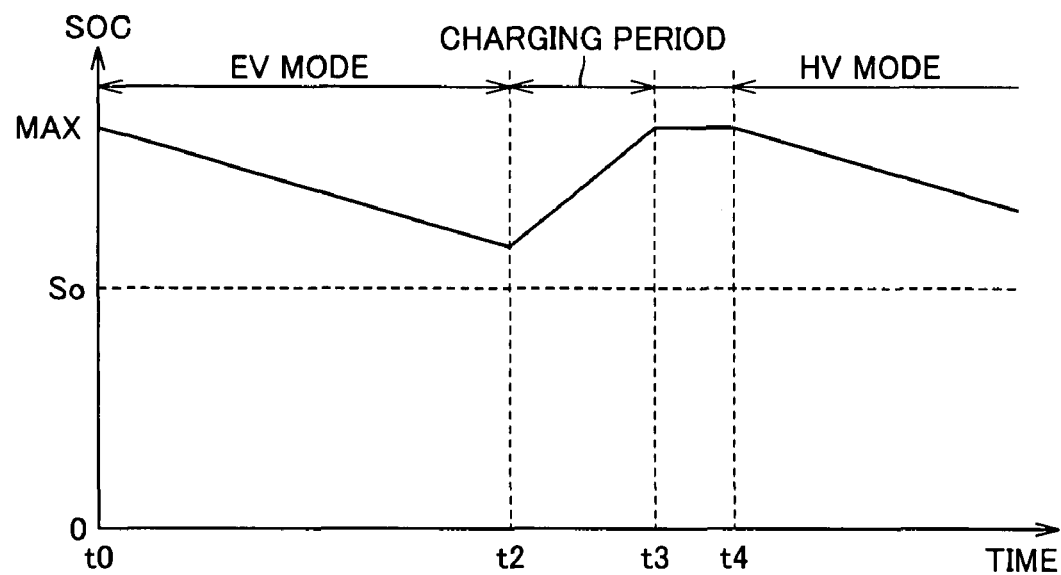
FIG. 9 is a graph showing a change of SOC of the electricity storage device when traveling continues in EV mode.

FIG. 9 is a graph showing a change of SOC of electricity storage device B in a case where traveling continues in EV mode. Referring to FIG. 9, it is assumed that, at time t0, hybrid vehicle 100 starts traveling from the fully charged state of electricity storage device B. At time t2, the traveling of hybrid vehicle 100 ends before SOC reaches control target So, and electricity storage device B is charged during time t2-t3. Then, at time t4, hybrid vehicle 100 starts traveling again from the fully charged state of electricity storage device B.

In this case, the travel mode is not shifted from EV mode to HV mode, and the traveling is started again in EV mode after charging. Such a manner of using a vehicle is more outstanding with larger capacity of electricity storage device B. Then, engine 4 is hardly started, so that it becomes difficult to keep engine 4 in a good condition as described above. In addition, when an abnormality occurs in engine 4, detection of the abnormality is delayed.

Therefore, in order to prevent the harmful effects as described above resulting from reduction in frequency of starting engine 4, the first embodiment allows the driver to shift the travel mode from EV mode to HV mode during traveling in EV mode.

Figure 10:
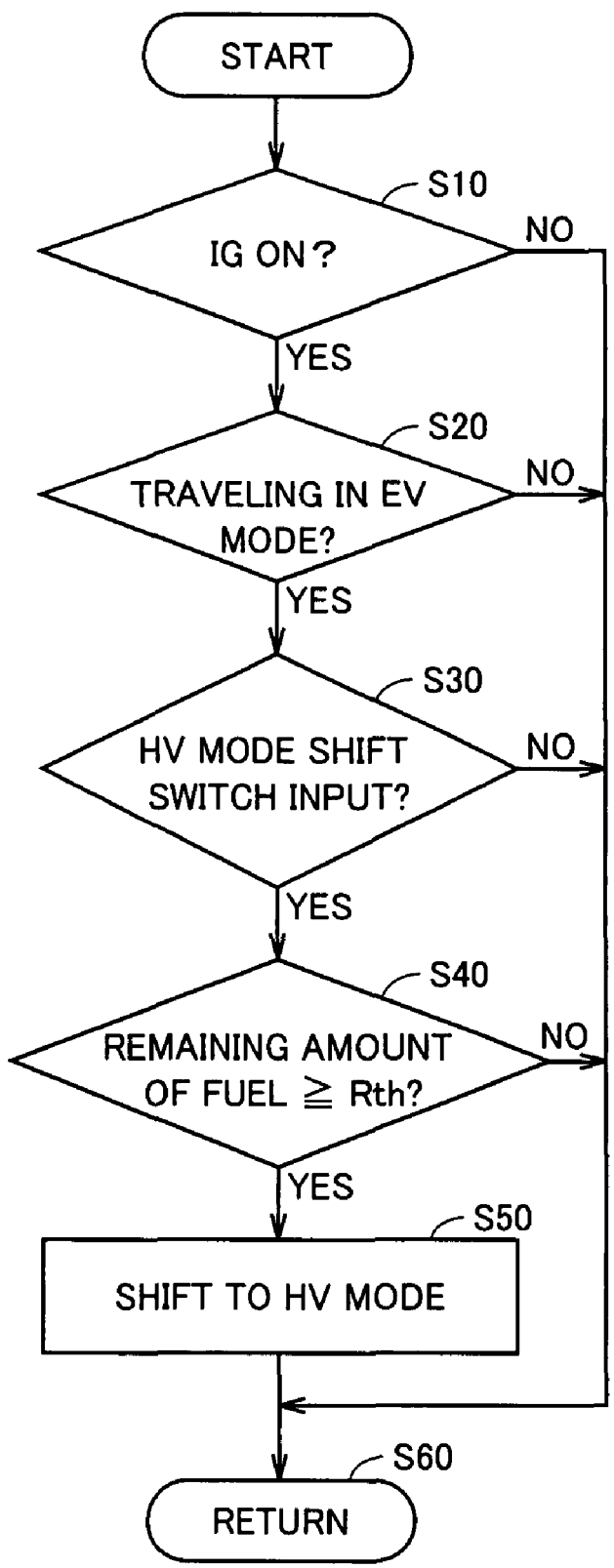
FIG. 10 is a flowchart showing a control structure of a program for an operation of an HV mode shift switch shown in FIG. 1.

FIG. 10 is a flowchart showing a control structure of a program for an operation on HV mode shift switch 52 shown in FIG. 1. It is noted that the process shown in this flowchart is also invoked from the main routine for execution every certain time or every time prescribed conditions are met.

Referring to FIG. 10, control device 60 determines whether or not the ignition key is turned to ON position, based on signal IG from the ignition key (step S10). If control device 60 determines that the ignition key is not turned to ON position (NO in step S10), a series of processes ends, and the control returns to the main routine (step S60).

If it is determined in step S10 that the ignition key is turned to ON position (YES in step S10), control device 60 determines whether or not the traveling is in EV mode at present (step S20). If control device 60 determines that the traveling is not in EV mode (NO in step S20), a series of processes ends, and the control returns to the main routine (step S60).

If it is determined in step S20 that the traveling is in EV mode (YES in step S20), control device 60 determines whether or not an on-operation is performed on HV mode shift switch 52 by the driver, based on a signal from HV mode shift switch 52 (step S30). If control device 60 determines that the signal from HV mode shift switch 52 is at L level and an on-operation is not performed on HV mode shift switch 52 (NO in step S30), a series of processes ends, and the control returns to the main routine (step S60).

On the other hand, if it is determined that the signal from HV mode shift switch 52 is at H level and an on-operation is performed on HV mode shift switch 52 by the driver (YES in step S30), control device 60 determines whether or not the value indicated by signal FUEL from fuel tank 58 is equal to or larger than a threshold value Rth indicating reduction in the remaining amount of fuel (step S40). If it is determined that the value of signal FUEL is smaller than threshold value Rth (NO in step S40), control device 60 does not perform shifting to HV mode of traveling by driving engine 4, since the fuel in fuel tank 58 which is an energy source of engine 4 is low. In other words, control device 60 invalidates the on-operation of HV mode shift switch 52, and the control returns to the main routine (step S60).

If it is determined in step S40 that the value of signal FUEL is equal to or larger than threshold value Rth (YES in step S40), control device 60 shifts the travel mode from EV mode to HV mode (step S50). Specifically, control device 60 outputs signal PWM2 to inverter 20 to allow inverter 20 to start engine 4. Accordingly, engine 4 also operates as a motive power source of hybrid vehicle 100. Thereafter, control device 60 ends a series of processes, and the control returns to the main routine (step S60).

Figure 11:
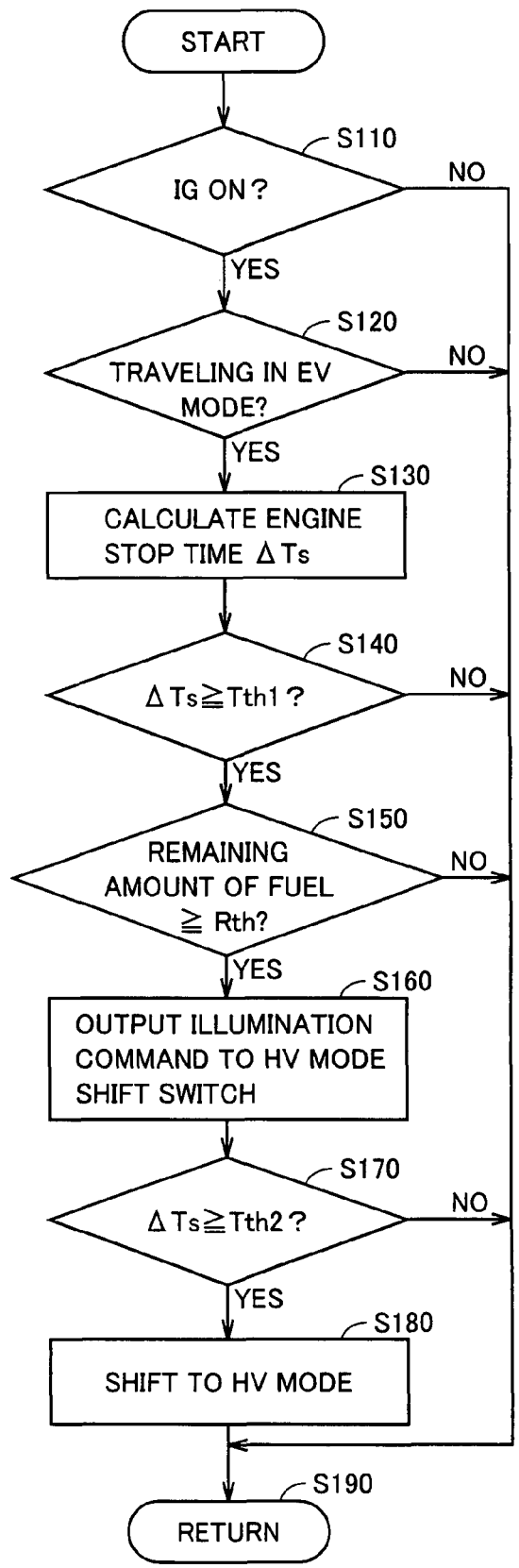
FIG. 11 is a flowchart showing a control structure of a program for control in a case where an on-operation is not preformed on the HV mode shift switch by the driver.

FIG. 11 is a flowchart showing a control structure of a program for control in a case where on-operation is not performed on HV mode shift switch 52 by the driver. It is noted that the process shown in this flowchart is also invoked from the main routine for execution every certain time or every time prescribed conditions are met.

Referring to FIG. 11, the processes in steps S110 and S120 are similar to the processes in steps S10 and S20 shown in FIG. 10, respectively. Then, if it is determined that the traveling is in EV mode in step S120 (YES in step S120), control device 60 calculates a stop time $\Delta Ts$ of engine 4 (step S130). Specifically, control device 60 counts the time from an operation stop time of engine 4 by a not-shown timer. Here, the operation stop time of engine 4 may be stored and stop time $\Delta Ts$ may be calculated based on the present time and the operation stop time of engine 4.

Then, control device 60 determines whether or not stop time $\Delta Ts$ of engine 4 is equal to or longer than a preset threshold time Tth1 (step S140). If it is determined that stop time $\Delta Ts$ is shorter than threshold time Tth1 (NO in step S140), control device 60 ends a series of processes, and the control returns to the main routine (step S190).

On the other hand, if it is determined in step S140 that stop time $\Delta Ts$ is equal to or longer than threshold time Tth1 (YES in step S140), that is, if it is determined that engine 4 has not been operated for a long time, control device 60 determines whether or not the value indicated by signal FUEL from fuel tank 58 is equal to or larger than threshold value Rth (step Si 50). If it is determined that the value of signal FUEL is smaller than threshold value Rth (NO in step S150), control device 60 does not perform shifting to HV mode of driving engine 4. In other words, control device 60 invalidates the on-operation of HV mode shift switch 52, and the control returns to the main routine (step S190).

If it is determined in step S150 that the value of signal FUEL is equal to or larger than threshold value Rth (YES in step S150), control device 60 outputs an illumination command to HV mode shift switch 52 (step S160). Then, HV mode shift switch 52 illuminates to prompt the driver to shift to HV mode.

Subsequently, control device 60 determines whether or not stop time $\Delta Ts$ of engine 4 is equal to or longer than a preset threshold time Tth2 (step S170). This threshold time Tth2 is longer than threshold time Tth1 for outputting an illumination command to HV mode shift switch 52 and is a time for forcedly shifting the travel mode from EV mode to HV mode in the case where an on-operation is not performed on HV mode shift switch 52 by the driver even though HV mode shift switch 52 illuminates. If control device 60 determines that stop time $\Delta Ts$ is shorter than threshold time Tth2 (NO in step S170), a series of processes ends, and the control returns to the main routine (step S190).

On the other hand, if it is determined in step S170 that stop time $\Delta Ts$ is longer than threshold time Tth2 (YES in step S170), control device 60 forcedly shifts the travel mode from EV mode to HV mode (step S180). Accordingly, engine 4 also operates as a motive power source of hybrid vehicle 100. Thereafter, control device 60 ends a series of processes, and the control returns to the main routine (step S190).

In this first embodiment, when engine 4 is in a non-operating state for a long time, engine 4 is driven with the travel mode set in HV mode in order to keep a good condition of engine 4 and to be able to detect an abnormality of engine 4 at an early stage. However, when engine 4 operates but the operation time is short, the operation cannot contribute to achieving the above-noted objects, specifically, keeping a good condition of engine 4 and detection of an abnormality of engine 4 at an early stage. Then, if engine 4 operates but the operation time is shorter than a preset threshold time, it is assumed that engine 4 is continuously in a non-operating state.

Figure 12:
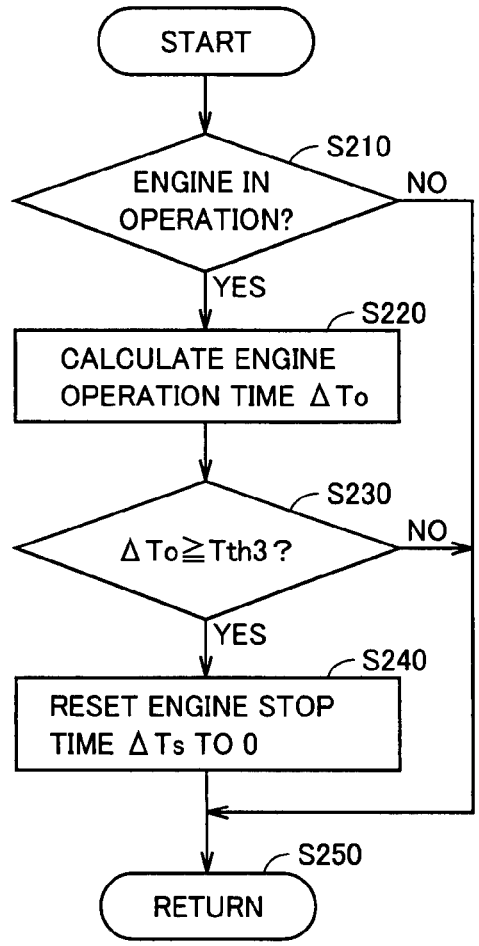
FIG. 12 is a flowchart showing a control structure of a program for an engine stop time count process.

FIG. 12 is a flowchart showing a control structure of a program for a count process of stop time $\Delta Ts$ of engine 4. It is noted that the process shown in this flowchart is also invoked from the main routine for execution every certain time or every time prescribed conditions are met.

Referring to FIG. 12, control device 60 determines whether or not engine 4 is in operation (step S210). If control device 60 determines that engine 4 stops (NO in step S210), a series of processes ends, and the control returns to the main routine (step S250).

If it is determined in step S210 that engine 4 is in operation (YES in step S210), control device 60 calculates operation time $\Delta To$ of engine 4 (step S220). Specifically, control device 60 counts the time from the operation starting time of engine 4 by a not-shown timer. Here, the operation starting time of engine 4 may be stored, and operation time $\Delta To$ may be calculated based on the present time and the operation starting time of engine 4.

Then, control device 60 determines whether or not operation time $\Delta To$ of engine 4 is equal to or longer than a preset threshold time Tth3 (step S230). If it is determined that operation time $\Delta To$ is shorter than threshold time Tth3 (NO in step S230), control device 60 ends a series of processes without resetting stop time $\Delta Ts$ of engine 4 to 0, and the control returns to the main routine (step S250). In other words, in this case, stop time $\Delta Ts$ of engine 4 continues to be counted.

On the other hand, if it is determined in step S230 that operation time $\Delta To$ is equal to or longer than threshold time Tth3 (YES in step S230), control device 60 resets stop time $\Delta Ts$ of engine 4 to 0 (step S240).

Figure 13:
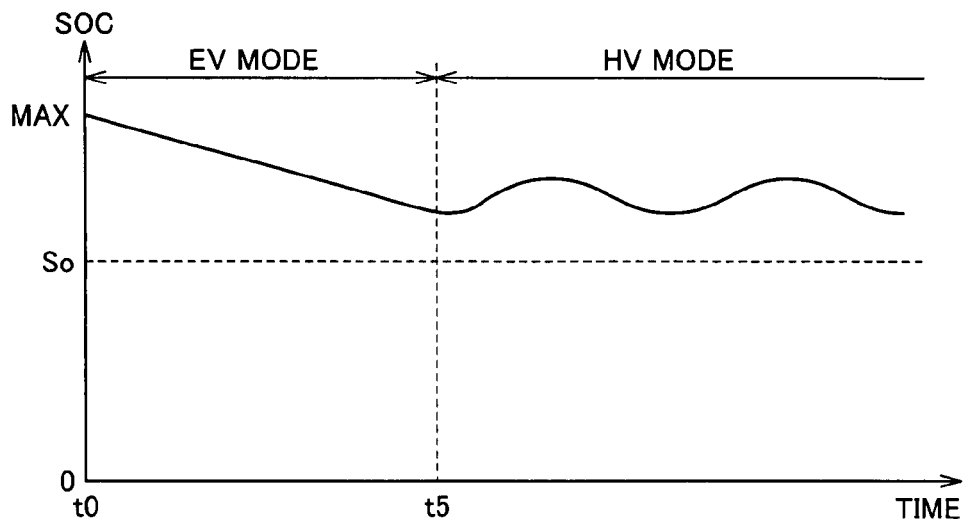
FIG. 13 is a graph showing a change of SOC of the electricity storage device when the travel mode is forcedly switched from EV mode to HV mode.

FIG. 13 is a graph showing a change of SOC of electricity storage device B when the travel mode is forcedly switched from EV mode to HV mode. It is noted that the case where the travel mode is forcedly switched includes a case where it is switched by HV mode shift switch 52 and a case where it is forcedly switched by control device 60 through the process shown in FIG. 11.

Referring to FIG. 13, the axis of ordinates represents SOC of electricity storage device B and the axis of abscissas represents the elapsed time. Then, it is assumed that, at time t0, hybrid vehicle 100 starts traveling from the fully charged state of electricity storage device B.

At time t5, an on-operation is performed on HV mode shift switch 52 by the driver during traveling in EV mode or the travel mode is forcedly switched from EV mode to HV mode by control device 60. Then, engine 4 starts, and the output of engine 4 is used for the driving force for the vehicle, and in addition, electric power generation is performed by motor generator MG1. In other words, after time t5, the traveling is performed in HV mode of traveling using electricity storage device B, motor generator MG2 and engine 4 as motive power sources.

Here, although not specifically shown, after the travel mode is switched from EV mode to HV mode at time t5 and engine 4 starts, the travel mode may be switched to EV mode again, for example, if engine 4 operates for the aforementioned threshold time Tth3 or longer.

As described above, the first embodiment allows engine 4 to be driven by switching to HV mode during traveling in EV mode, so that engine 4 can be kept in a good condition. In addition, an abnormality of engine 4 may be discovered at an early stage, if it occurs. Moreover, the users' desire to enjoy riding by driving engine 4 can be satisfied.

Second Embodiment

Figure 14:
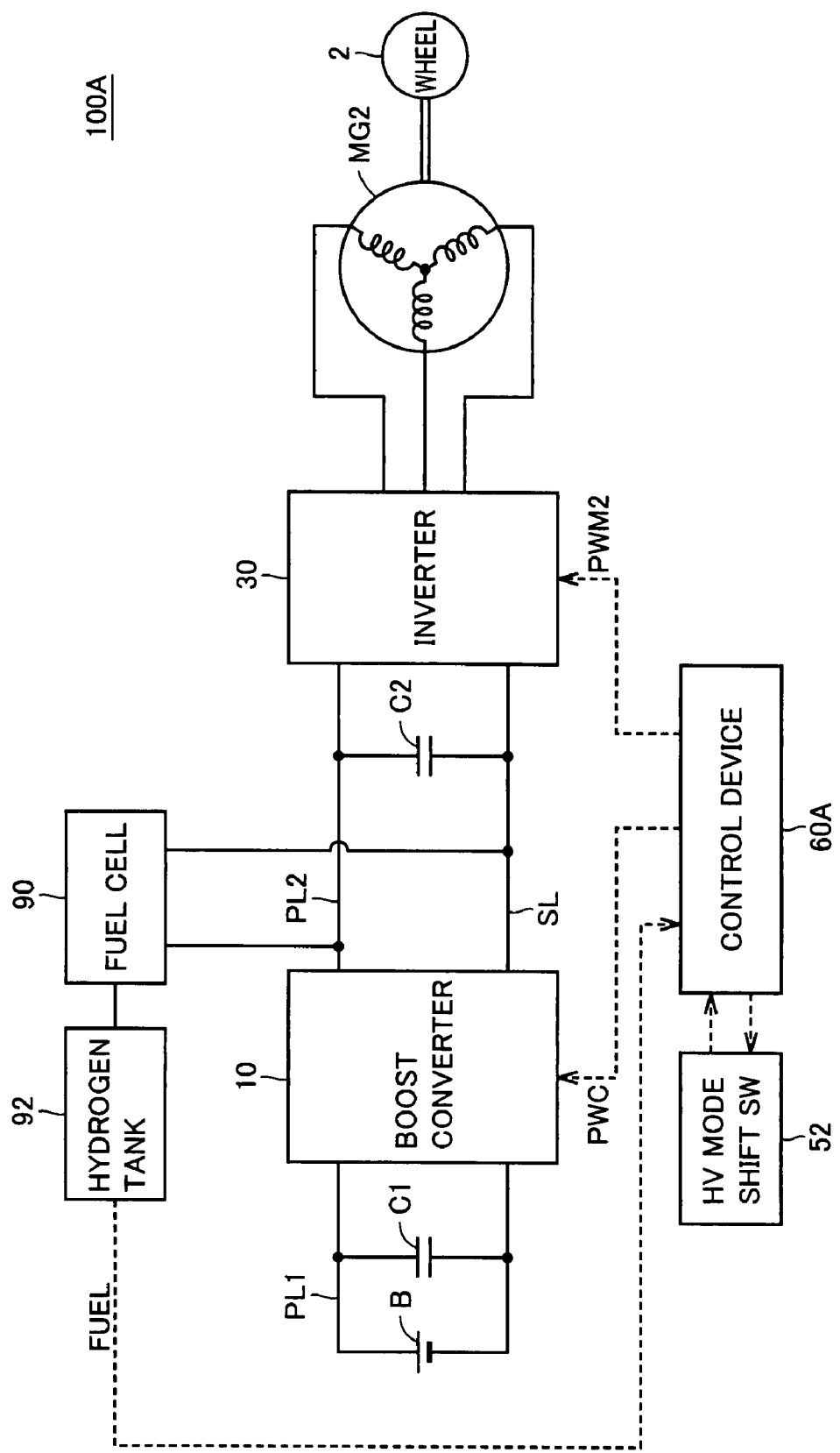
FIG. 14 is a schematic block diagram of a hybrid vehicle in accordance with a second embodiment of this invention.

FIG. 14 is a schematic block diagram of a hybrid vehicle in accordance with a second embodiment of this invention. Referring to FIG. 14, a hybrid vehicle 100A includes electricity storage device B, boost converter 10, a fuel cell 90, a hydrogen tank 92, inverter 30, motor generator MG2, wheel 2, HV mode shift switch 52, a control device 60A, and capacitors C1, C2.

Fuel cell 90 is a direct-current power generation battery to obtain electric energy from chemical reaction energy produced by a chemical reaction of hydrogen supplied from hydrogen tank 92 with oxidant. Fuel cell 90 is connected to power supply line PL2 and ground line SL to supply the generated direct-current power to power supply line PL2.

In other words, this hybrid vehicle 100A has an electric power source having a hybrid structure of electricity storage device B and fuel cell 90. Hybrid vehicle 100A in accordance with this second embodiment can be regarded as having a motive power source comprised of fuel cell 90 in place of a motive power source comprised of engine 4 and motor generator MG1 in a structure of hybrid vehicle 100 in the first embodiment.

Hydrogen tank 92 supplies hydrogen to fuel cell 90. In addition, hydrogen tank 92 detects the remaining amount of hydrogen and outputs signal FUEL indicating the remaining amount of hydrogen (for example, a signal corresponding to a pressure in hydrogen tank 92) to control device 60A.

Control device 60A generates signal PWC for driving boost converter 10 and outputs the generated signal PWC to boost converter 10. In addition, control device 60A generates signal PWM2 for driving motor generator MG2 and outputs the generated signal PWM2 to inverter 30.

Moreover, control device 60A shifts the travel mode from EV mode to HV mode when receiving an H level signal from HV mode shift switch 52 during traveling in EV mode. Here, in this second embodiment, EV mode is a travel mode of traveling only using electricity storage device B as an electric power source, and HV mode is a travel mode of traveling using electricity storage device B and fuel cell 90 as electric power sources.

It is noted that, similar to control device 60 in the first embodiment, control device 60A invalidates the on-operation from HV mode shift switch 52 and does not perform shifting from EV mode to HV mode when it is determined that the remaining amount of hydrogen in hydrogen tank 92 is lower than threshold value Rth indicating reduction in the remaining amount, based on signal FUEL from hydrogen tank 92.

Still furthermore, when the non-operating time of fuel cell 90 exceeds a prescribed time as preset, control device 60A allows HV mode shift switch 52 to illuminate to prompt the driver to shift from EV mode to HV mode. Then, control device 60A forcedly shifts the travel mode from EV mode to HV mode when HV mode shift switch 52 is not operated by the driver even though HV mode shift switch 52 is illuminated.

It is noted that, also in this case, control device 60A does not perform shifting from EV mode to HV mode when it is determined that the remaining amount of hydrogen in hydrogen tank 92 is lower than threshold value Rth.

As described above, this second embodiment allows fuel cell 90 to operate by switching to HV mode during traveling in EV mode, so that fuel cell 90 can be kept in a good condition. In addition, an abnormality of fuel cell 90 can be discovered at an early stage, if it occurs.

In each of the first and second embodiments as described above, HV mode shift switch 52 functions as not only an input device for switching a travel mode but also a notification portion illuminating in response to an illumination command from control devices 60, 60A to prompt the driver to perform an input operation. However, a notification portion may be provided separately. For example, a notice may be given by a sound device or a display image may appear on an operation panel.

Furthermore, in the first embodiment as described above, alternating-current power from commercial power supply 55 is provided to neutral points N1 and N2 of motor generators MG1 and MG2, and electricity storage device B is charged using each phase coil of motor generators MG1, MG2 and inverters 20, 30. The present invention is also applicable to a hybrid vehicle separately provided with an external charging device (AC/DC converter) inside or outside the vehicle. However, in accordance with the first embodiment above, it is not necessary to separately provide an external charging device, thereby achieving a cost reduction and a weight reduction of the vehicle.

In the foregoing description, motor generator MG2 and electricity storage device B form "a first motive power source" in this invention, and each of engine 4 and fuel cell 90 corresponds to "a second motive power source" in this invention. Furthermore, control devices 60, 60A correspond to "control portion" in this invention, and HV mode shift switch 52 corresponds to "input device" and "notification portion" in this invention. In addition, motor generator MG2 corresponds to "a first electric rotating machine" and "rotating machine" in this invention, and engine 4 corresponds to "internal combustion engine" in this invention. Still furthermore, the process in step S130 executed by control device 60 corresponds to a process executed by "timer portion" in this invention, and fuel tank 58 and hydrogen tank 92 correspond to "detection portion" in this invention. Furthermore, connector 50 corresponds to "electric power input portion" in this invention, and motor generator MG1 corresponds to "second electric rotating machine" in this invention. In addition, inverters 20, 30 correspond to "a second inverter" and "a first inverter" in this invention, respectively, and first and second inverter control portions 62, 63 and AC input control portion 64 form "inverter control portion" in this invention.

The embodiments disclosed herein should be understood as illustrative rather than limitative in all respects. The scope of the present invention is shown not by the foregoing description of the embodiments and equivalents to the claims and all modifications within the claims are intended to be embraced.

The invention claimed is:
1. A hybrid vehicle comprising:
first and second motive power sources;
control means to switch between a first travel mode of traveling by stopping said second motive power source and a second travel mode of traveling using said first and second motive power sources for controlling said first and second motive power sources according to selected said first or second travel mode;
an input device actuated by a user for switching a travel mode to said second travel mode during traveling in said first travel mode;
timer means for counting a non-operating time of said second motive power source; and
notification means for prompting a driver to operate said input device when said non-operating time is equal to or longer than a first prescribed time.

2. The hybrid vehicle according to claim 1, wherein
said first motive power source includes a first electric rotating machine and an electricity storage device supplying electric power to said first electric rotating machine,
said second motive power source includes an internal combustion engine,
said first travel mode is an electric vehicle mode of traveling by stopping said internal combustion engine and driving said first electric rotating machine, and
said second travel mode is a hybrid mode of traveling by driving said first electric rotating machine and said internal combustion engine.

3. The hybrid vehicle according to claim 2, further comprising an electric power input portion receiving electric power provided from an outside of the vehicle for charging said electricity storage device.

4. The hybrid vehicle according to claim 3, further comprising:
a second electric rotating machine generating electric power using an output of said internal combustion engine and being able to supply the generated electric power to said electricity storage device;
first and second inverters provided respectively corresponding to said first and second electric rotating machines; and
inverter control means for controlling said first and second inverters, wherein
said first and second electric rotating machines respectively include first and second three-phase coils as stator coils,
said electric power input portion includes
a first terminal connected to a neutral point of said first three-phase coil, and
a second terminal connected to a neutral point of said second three-phase coil, and
said inverter control means controls said first and second inverters such that alternating-current power provided to said first and second terminals is converted into direct-current power to be provided to said electricity storage device.

5. The hybrid vehicle according to claim 1, wherein
said first motive power source includes an electric rotating machine and an electricity storage device capable of supplying electric power to said electric rotating machine,
said second motive power source includes a fuel cell capable of supplying electric power to said electric rotating machine,
said first travel mode is an electric vehicle mode of traveling by stopping said fuel cell and driving said electric rotating machine using electric power from said electricity storage device, and
said second travel mode is a hybrid mode of traveling by driving said electric rotating machine using electric power from said fuel cell and said electricity storage device.

6. The hybrid vehicle according to claim 1, wherein said control means switches the travel mode from said first travel mode to said second travel mode when the non-operating time of said second motive power source is equal to or longer than a second prescribed time which is longer than said first prescribed time.

7. The hybrid vehicle according to claim 1, wherein when an operating time of said second motive power source is shorter than a third prescribed time, said timer means counts said non-operating time, assuming that a non-operating state of said second motive power source continues.

8. The hybrid vehicle according to claim 1, further comprising detection means for detecting a remaining amount of energy of said second motive power source, wherein
when said remaining amount of energy is lower than a prescribed amount, said control means halts switching from said first travel mode to said second travel mode.

9. A control method of controlling a hybrid vehicle including first and second motive power sources,
wherein said hybrid vehicle travels in a first travel mode of traveling by stopping said second motive power source or a second travel mode of traveling using said first and second motive power sources,
said control method comprising:
a first step of determining whether or not traveling is in said first travel mode;
a second step of determining whether or not an input device for switching a travel mode to said second travel mode, according to a travel mode switch instruction input by a driver, is operated by the driver, when it is determined that traveling is in said first travel mode;
a third step of switching the travel mode from said first travel mode to said second travel mode, when it is determined that said input device is operated;
a fourth step of counting a non-operating time of said second motive power source; and
a fifth step of prompting a driver to operate said input device, when said non-operating time is equal to or longer than a first prescribed time.

10. The control method according to claim 9, further comprising a sixth step of switching the travel mode from said first travel mode to said second travel mode, when the non-operating time of said second motive power source is equal to or longer than a second prescribed time which is longer than said first prescribed time.

11. The control method according to claim 10, further comprising:
a seventh step of detecting a remaining amount of energy of said second motive power source; and
an eighth step of halting switching from said first travel mode to said second travel mode, when said remaining amount of energy is lower than a prescribed amount.

12. The control method according to claim 9, wherein when an operating time of said second motive power source is shorter than a third prescribed time, said fourth step counts said non-operating time, assuming that a non-operating state of said second motive power source continues.

13. The control method according to claim 9, wherein
said first motive power source includes a first electric rotating machine and an electricity storage device supplying electric power to said first electric rotating machine,
said second motive power source includes an internal combustion engine,
said hybrid vehicle further includes
an electric power input portion receiving electric power provided from an outside of the vehicle for charging said electricity storage device,
a second electric rotating machine generating electric power using an output of said internal combustion engine and being able to supply the generated electric power to said electricity storage device, and
first and second inverters provided respectively corresponding to said first and second electric rotating machines,
said first and second electric rotating machines respectively include first and second three-phase coils as stator coils, said electric power input portion includes
a first terminal connected to a neutral point of said first three-phase coil, and
a second terminal connected to a neutral point of said second three-phase coil, and
said control method further comprises another step of controlling said first and second inverters such that alternating-current power provided to said first and second terminals is converted into direct-current power to be provided to said electricity storage device.

14. A hybrid vehicle comprising:
first and second motive power sources;
control means to switch between a first travel mode of traveling by stopping said second motive power source and a second travel mode of traveling using said first and second motive power sources for controlling said first and second motive power sources according to selected said first or second travel mode;
an input device actuated by a user for switching a travel mode to said second travel mode during traveling in said first travel mode,
wherein said first motive power source includes a first electric rotating machine and an electricity storage device supplying electric power to said first electric rotating machine,
said second motive power source includes an internal combustion engine,
said first travel mode is an electric vehicle mode of traveling by stopping said internal combustion engine and driving said first electric rotating machine,
said second travel mode is a hybrid mode of traveling by driving said first electric rotating machine and said internal combustion engine, and
the hybrid vehicle further comprises an electric power input portion receiving electric power provided from an outside of the vehicle for charging said electricity storage device;
a second electric rotating machine generating electric power using an output of said internal combustion engine and supplying the generated electric power to said electricity storage device;
first and second inverters provided respectively corresponding to said first and second electric rotating machines; and
inverter control means for controlling said first and second inverters,
said first and second electric rotating machines respectively include first and second three-phase coils as stator coils,
said electric power input portion includes a first terminal connected to a neutral point of said first three-phase coil and
a second terminal connected to a neutral point of said second three-phase coil, and
said inverter control means controls said first and second inverters such that alternating-current power provided to said first and second terminals is converted into direct-current power to be provided to said electricity storage device.

15. A control method of controlling a hybrid vehicle including first and second motive power sources,
wherein said hybrid vehicle travels in a first travel mode of traveling by stopping said second motive power source or a second travel mode of traveling using said first and second motive power sources,
said control method comprising:
a first step of determining whether or not traveling is in said first travel mode;
a second step of determining whether or not an input device for switching a travel mode to said second travel mode, according to a travel mode switch instruction input by a driver, is operated by the driver, when it is determined that traveling is in said first travel mode;
a third step of switching the travel mode from said first travel mode to said second travel mode, when it is determined that said input device is operated,
wherein said first motive power source includes a first electric rotating machine and an electricity storage device supplying electric power to said first electric rotating machine,
said second motive power source includes an internal combustion engine,
said hybrid vehicle further includes
an electric power input portion receiving electric power provided from an outside of the vehicle for charging said electricity storage device,
a second electric rotating machine generating electric power using an output of said internal combustion engine and being able to supply the generated electric power to said electricity storage device, and
first and second inverters provided respectively corresponding to said first and second electric rotating machines,
said first and second electric rotating machines respectively including first and second three-phase coils as stator coils,
said electric power input portion includes a first terminal connected to a neutral point of said first three-phase coil and a second terminal connected to a neutral point of said second three-phase coil, and
said control method further comprises another step of controlling said first and second inverters such that alternating-current power provided to said first and second terminals is converted into direct-current power to be provided to said electricity storage device.

* * * * *